(12) United States Patent
Toyoshima et al.

(10) Patent No.: US 6,634,230 B2
(45) Date of Patent: Oct. 21, 2003

(54) VIBRATING GYROSCOPE AND ELECTRONIC UNIT USING THE SAME

(75) Inventors: Isao Toyoshima, Ritto (JP); Akira Mori, Nagaokakyo (JP); Nobuyuki Ishitoko, Moriyama (JP); Takayuki Shimamoto, Moriyama (JP); Akira Kumada, Otsu (JP); Iku Nagai, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/124,418

(22) Filed: Apr. 18, 2002

(65) Prior Publication Data

US 2002/0166381 A1 Nov. 14, 2002

(30) Foreign Application Priority Data

Apr. 19, 2001 (JP) ........................... 2001-121531
Jan. 16, 2002 (JP) ........................... 2002-007675

(51) Int. Cl.[7] .............................................. G01C 19/00
(52) U.S. Cl. .................................................. 73/504.14
(58) Field of Search ....................... 73/504.14, 504.12, 73/504.04, 504.03, 504.02; 310/368

(56) References Cited

U.S. PATENT DOCUMENTS

| 5,430,342 | A |   | 7/1995 | Watson |  |
|---|---|---|---|---|---|
| 5,765,046 | A | * | 6/1998 | Watanabe et al. | 396/53 |
| 6,035,713 | A | * | 3/2000 | Mori et al. | 73/504.14 |
| 6,116,086 | A | * | 9/2000 | Fujimoto | 73/504.14 |
| 6,250,158 | B1 | * | 6/2001 | Stewart | 73/504.14 |
| 6,532,816 | B2 | * | 3/2003 | Fujimoto | 73/504.14 |
| 2001/0013251 | A1 | * | 8/2001 | Fujimoto |  |
| 2002/0100324 | A1 | * | 8/2002 | Fujimoto |  |
| 2002/0166380 | A1 | * | 11/2002 | Koike |  |

FOREIGN PATENT DOCUMENTS

JP          11-125526          5/1999

* cited by examiner

Primary Examiner—Richard A. Moller
(74) Attorney, Agent, or Firm—Keating & Bennett, LLP

(57) ABSTRACT

A vibrating gyroscope includes supporting members which are fixed in the vicinity of two node axes n1 and n2 of a bar-shaped vibrator. The supporting members corresponding to node axis n1 extend from the locations at which they are fixed to the vibrator in the widthwise direction of the vibrator, and also include bending portions and a proximity portion. The bending portions bend toward node axis n1. At the proximity portion, the supporting members are in close proximity with each other with a gap therebetween in the vicinity of node axis n1.

20 Claims, 4 Drawing Sheets

VIBRATING GYROSCOPE AND ELECTRONIC UNIT USING THE SAME

BACKGROUND OF THE INVENTION

1. Field of the Invention

The present invention relates to a vibrating gyroscope and an electronic unit including the same. More particularly, the present invention relates to a vibrating gyroscope used in a hand-shaking correction device for use in, for example, an automobile navigation system or a video camera, and to an electronic unit including the above-described vibrating gyroscope.

2. Description of the Related Art

A gyroscope is used for, for example, a hand-shaking correction device for use in an automobile navigation system or a video camera. One type of such a gyroscope is a vibrating gyroscope for detecting the angular velocity applied to a vibrator by detecting distortion of a bar-shaped bending-vibrating-type vibrator caused by the Coriolis force. In the vibrating gyroscope, the vibrator must be supported without interfering with the vibration of the vibrator. Japanese Unexamined Patent Application Publication No. 11-125526 discloses a structure for supporting a vibrator.

In the vibrating gyroscope disclosed in this publication, a bar-shaped vibrator having two main surfaces (first and second main surfaces) includes a pair of supporting members fixed to electrodes provided on the first and second main surfaces, respectively, in the vicinity of two node points of the vibration generated by driving. The supporting members extend from the first and second main surfaces of the vibrator in the widthwise direction of the vibrator. A bending portion having a component in the longitudinal direction of the vibrator is also provided between the portion of the supporting member fixed to the electrode and the end of the supporting member.

Thus, the supporting members do not substantially interfere with the vibration of the vibrator, the vibration of the vibrator does not substantially leak to the exterior.

However, in the vibrating gyroscope disclosed in the above-described publication, the positions of the supporting members are not aligned with the node axes. This configuration often interferes with the vibration of the vibrator. Accordingly, the vibration of the vibrator leaks to the exterior via the supporting members, and the vibration is unstable, thereby decreasing the detection precision of the angular velocity.

SUMMARY OF THE INVENTION

In order to overcome the above-described problems, preferred embodiments of the present invention provide a vibrating gyroscope which does not interfere with the vibration of a vibrator, and an electronic unit including such a novel vibrating gyroscope.

A preferred embodiment of the present invention provides a vibrating gyroscope including a bar-shaped vibrator for performing double-end-free bending vibration in the thickness direction according to a drive signal, and a pair of supporting members securely provided and aligned with two node axes of the vibrator on both sides of the vibrator in the thickness direction. The pair of supporting members extend from positions at which the supporting members are fixed to the vibrator in the widthwise direction of the vibrator, and include bending portions which bend toward each of the node axes, and a proximity portion at which the pair of supporting members are in close proximity with each other with a gap provided in the vicinity of the corresponding node axis.

In the aforementioned vibrating gyroscope, the pair of supporting members preferably extend substantially parallel to the widthwise direction of the vibrator with the gap provided at the proximity portion.

In another preferred embodiment of the present invention, the pair of supporting members intersect with each other with the gap provided at the proximity portion.

In another preferred embodiment of the present invention, the pair of supporting members include extending portions that extend in the longitudinal direction of the vibrator via the bending portions and the proximity portion from the locations at which the pair of supporting members are fixed to the vibrator.

The minimum gap between the pair of supporting members at the proximity portion is preferably about one half or less than the thickness of the vibrator.

At the proximity portion, the gap between one of the pair of supporting members and the node axis is preferably substantially equal to the gap between the other supporting member and the node axis.

The vibrator preferably includes a first main surface and a second main surface extending in the thickness direction, electrodes provided on the first main surface and the second main surface, and the pair of supporting members being fixed to the electrodes.

In the vibrating gyroscope according to preferred embodiments of the present invention, the vibrator is preferably supported by the supporting members at the node axes. Thus, the leakage of the vibration of the vibrator to the exterior is greatly decreased, and the vibration is stable, thereby greatly improving the detection precision of the angular velocity.

An electronic unit according to another preferred embodiment of the present invention includes the vibrating gyroscope according to preferred embodiments described above.

The performance of the electronic unit according to preferred embodiments of the present invention is greatly improved by including the vibrating gyroscope according to preferred embodiments of the present invention.

Other features, elements, characteristics and advantages of the present invention will become more apparent from the following detailed description of preferred embodiments with reference to the attached drawings.

DETAILED DESCRIPTION OF PREFERRED EMBODIMENTS

Figure 1:
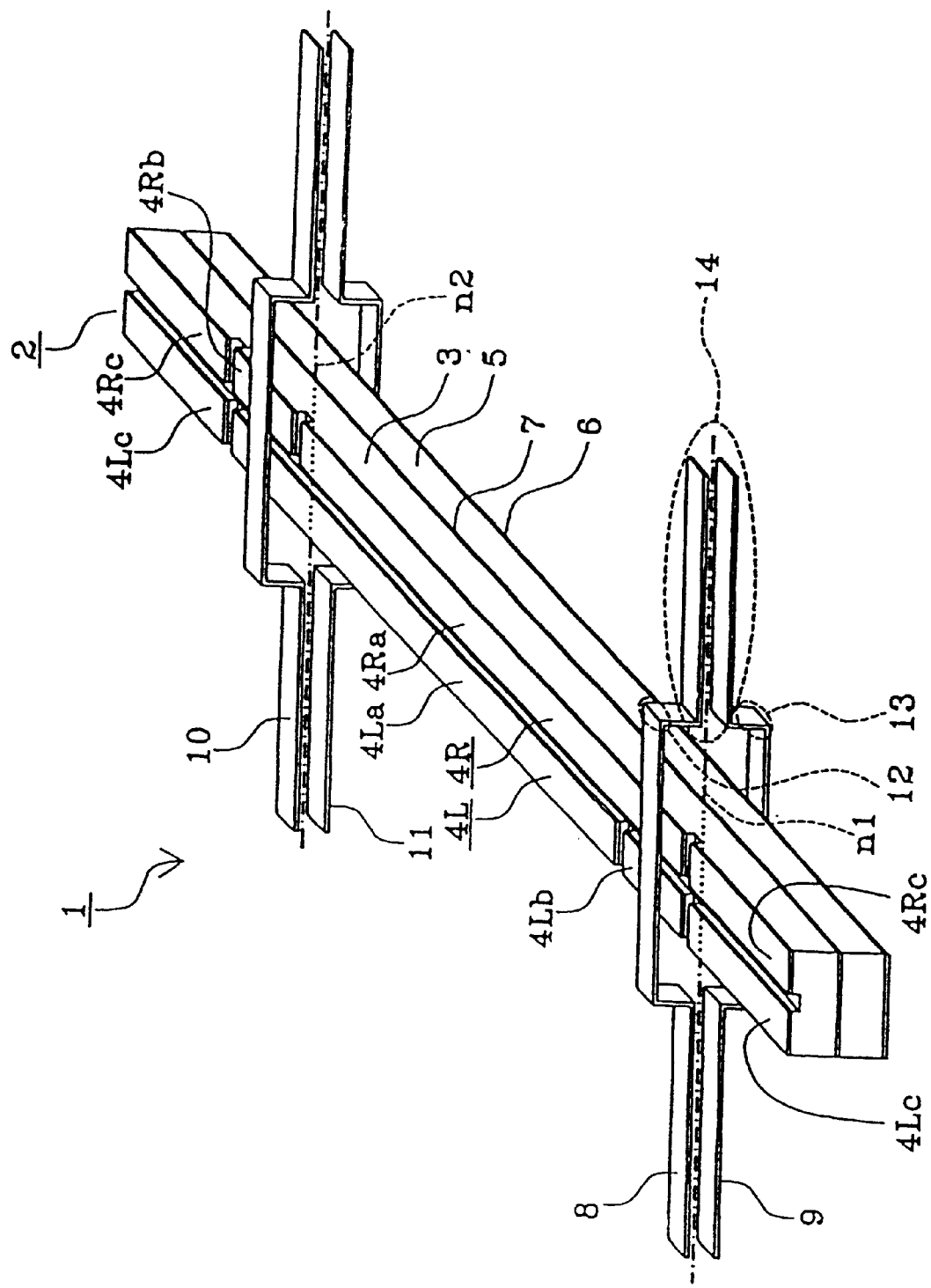
FIG. 1 is a perspective view illustrating a vibrating gyroscope according to a preferred embodiment of the present invention.

FIG. 1 is a perspective view illustrating a vibrating gyroscope according to a preferred embodiment of the present invention. In FIG. 1, a vibrating gyroscope 1 includes a vibrator 2, and planar conductive supporting members 8, 9, 10, and 11 made of a metal, for example, a Fe—Ni alloy or phosphorous bronze, or other suitable material.

The vibrator 2 includes piezoelectric substrates 3 and 5. The piezoelectric substrate 3 is polarized in the thickness direction, and includes split electrodes 4L and 4R divided in the widthwise direction and provided on a first main surface of the piezoelectric substrate 3. The piezoelectric substrate 5 is also polarized in the thickness direction, and includes a common electrode 6 on a first main surface of the piezoelectric substrate 5. The vibrator 2 is preferably formed by laminating second main surfaces of the piezoelectric substrates 3 and 5 with an intermediate electrode 7 therebetween. In this case, the polarizing directions of the piezoelectric substrates 3 and 5 are opposite to each other. The first main surface of the piezoelectric substrate 3 and the first main surface of the piezoelectric substrate 5 respectively define first and second main surfaces of the vibrator 2. The widthwise direction, the longitudinal direction, and the thickness direction of the vibrator 2 are substantially the same as those of the piezoelectric substrates 3 and 5. Each of the split electrodes 4L and 4R is longitudinally divided into four areas, such as main areas 4La and 4Ra, supporting areas 4Lb and 4Rb, and end areas 4Lc and 4Rc. The common electrode 6 and the intermediate electrode 7 are not divided, and are provided on the entire surface of the corresponding piezoelectric substrates.

The vibrator 2 performs double-end-free bending vibration in the thickness direction in response to a signal applied to the split electrodes 4L and 4R or the common electrode 6. In this case, two nodes which are located at positions about 0.224 times the length of the vibrator 2 from both ends of the vibrator 2 and which pass through the width of the vibrator 2 at the intermediate portion of the thickness direction (at the position at which the intermediate electrode 7 is provided) are indicated by node axes n1 and n2. The supporting areas 4Lb and 4Rb of the split electrodes 4L and 4R are located such that the node axes n1 and n2 are disposed under the supporting areas 4Lb and 4Rb, respectively.

The node axes of the vibrator 2 include not only the node axes of the vibration in the thickness direction generated by driving, but also node axes of the vibration in the widthwise direction generated by the Coriolis force. In the present invention, the node axes n1 and n2 indicate the first type of axes, i.e., the node axes of the vibration in the thickness direction.

The supporting members 8 and 9 are mechanically fixed via soldering or a conductive adhesive and are electrically connected to the split electrodes 4L and 4R and the common electrode 6 on the first and second main surfaces, respectively, of the vibrator 2 in the vicinity of the node axis n1. Similarly, the supporting members 10 and 11 are mechanically and electrically connected to the split electrodes 4L and 4R and the common electrode 6 on the first and second main surfaces, respectively, of the vibrator 2 in the vicinity of the node axis n2. More specifically, the supporting member 8 is fixed to the approximate central portion of the supporting area 4Lb of the split electrode 4L and in the vicinity of the edge of the main area 4Ra of the split electrode 4R, and the supporting member 10 is fixed in the vicinity of the edge of the main area 4La of the split electrode 4L and to the approximate central portion of the supporting area 4Rb of the split electrode 4R. As a result, the supporting members 8 and 10 are electrically insulated from each other, and are further define lead wires for the main areas 4Ra and 4La, respectively. The supporting members 9 and 11 are fixed to the common electrode 6, and are further define lead wires for the common electrode 6.

The supporting member 8 extends from the portions fixed to the split electrodes 4L and 4R in the widthwise direction of the vibrator 2 and further includes bending portions 12 which bend substantially perpendicularly to the node axis n1. The supporting member 9 extends from the portions fixed to the common electrode 6 in the widthwise direction of the vibrator 2 and further includes bending portions 13 which bend substantially perpendicularly to the node axis n1. The supporting members 8 and 9 are located in close proximity with each other in the vicinity of the node axis n1, and further include proximity portions 14 extending substantially parallel to the width of the vibrator 2 and along the node axis n1. The minimum gap of each of the proximity portions 14 between the supporting members 8 and 9 is about one half or less than the thickness of the vibrator 2. In the proximity portion 14, the gap between the supporting member 8 and the node axis n1 is approximately equal to that between the supporting member 9 and the node axis n1. As a result, the minimum gap between each of the supporting members 8 and 9 and the node axis n1 is about one fourth or less than the thickness of the vibrator 2.

More specifically, when the thickness of the vibrator 2 is, for example, about 1.0 mm, the minimum gap of the proximity portion 14 between the supporting members 8 and 9 is about 0.3 mm. In this case, the gap between each of the supporting members 8 and 9 and the node axis n1 is about 0.15 mm. In a known vibrating gyroscope, supporting members simply extend from the main surface of the vibrator along the width of the vibrator. In this case, the gap between the supporting member and the node axis is about 0.5 mm. Accordingly, in the present invention, the gap between the supporting member and the node axis is greatly decreased.

The same applies to the supporting members 10 and 11. That is, the supporting members 10 and 11 are provided with bending portions and proximity portions, as in the supporting members 8 and 9.

In the vibrating gyroscope 1 shown in FIG. 1, a drive device for bend-vibrating the vibrator 2 and angular-velocity detection device for detecting the angular velocity applied to the vibrator 2 from a signal output from the vibrator 2 are not shown.

In the above-described vibrating gyroscope 1, the supporting members 8 and 9 are located in close proximity to the node axis n1 at the positions of the proximity portions 14. The supporting members 10 and 11 are located in close proximity with the node axis n2 at the positions of the proximity portions 14. Accordingly, the supporting members 8 through 11 are configured such that they support the vibrator 2 in close proximity to the node axes n1 and n2. Thus, leakage of the vibration of the vibrator 2 to the exterior is greatly decreased, and the vibration is stable, thereby greatly improving the detection precision of the angular velocity.

In the vibrating gyroscope 1, the supporting members 8 through 11 define lead wires. Thus, if the corresponding supporting members are located excessively close to each other, they may be short-circuited when impact is applied, or signal leakage may occur via a stray capacitance generated between the supporting members. In the vibrating gyroscope 1, however, the two supporting members at the proximity portions 14 are separated from each other by a sufficient distance such that they do not contact each other and an influence of the stray capacitance is negligible.

In the vibrating gyroscope 1, the bending portions of the supporting members 8 through 11 are bent perpendicularly to the node axes n1 and n2. However, this angle of bending may be an obtuse angle or an acute angle. Generally, the bending portions are formed simultaneously with the formation of the outer configuration of the supporting members 8 through 11 by press-working a metallic plate material. Alternatively, the supporting members 8 through 11 may be formed by, for example, etching, and then bent by press working.

Figure 2:
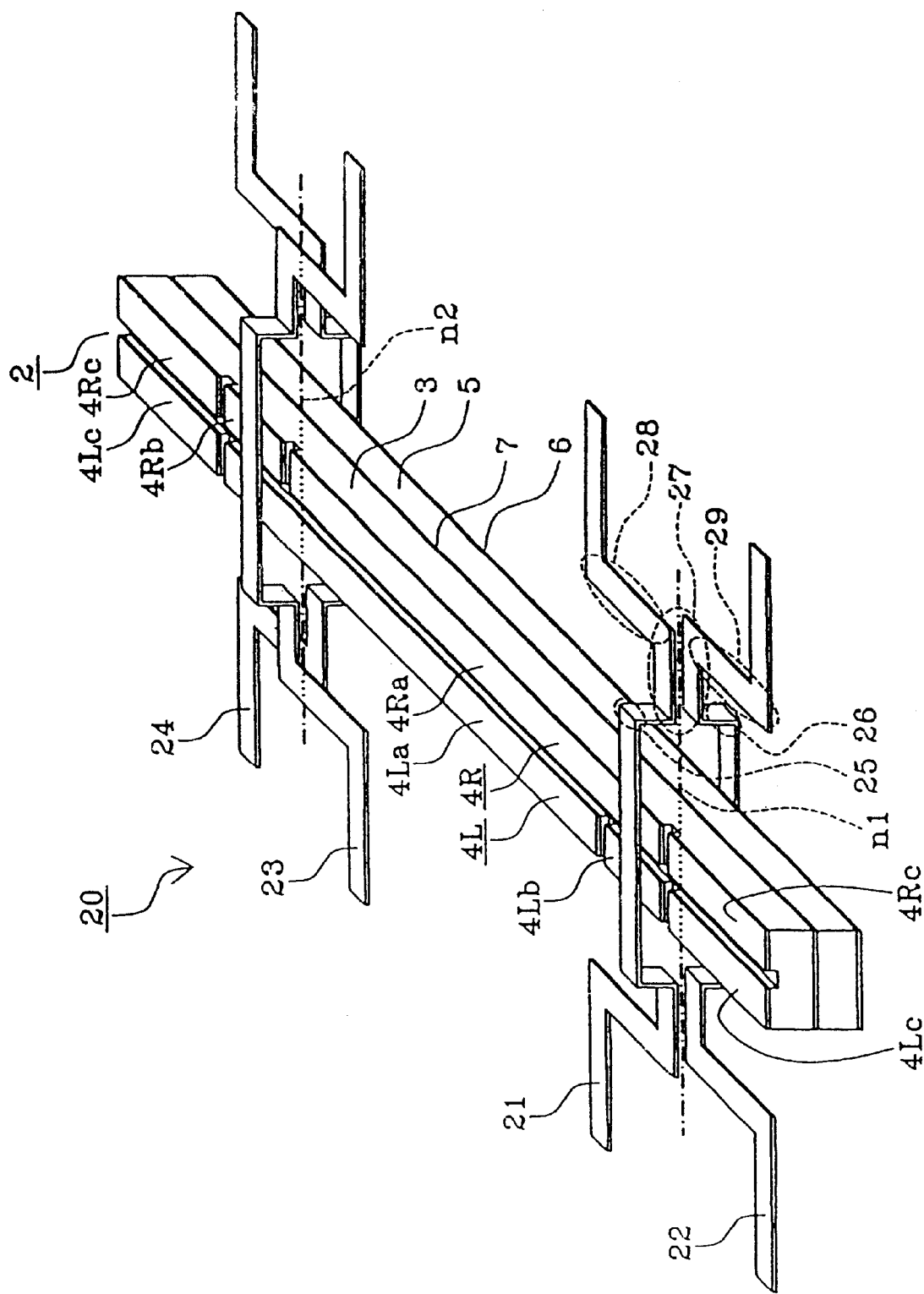
FIG. 2 is a perspective view illustrating a vibrating gyroscope according to another preferred embodiment of the present invention.

FIG. 2 is a perspective view illustrating a vibrating gyroscope according to another preferred embodiment of the present invention. In FIG. 2, similar components to those shown in FIG. 1 are designated with like reference numerals, and a repetitive explanation thereof is thus omitted.

In a vibrating gyroscope 20 shown in FIG. 2, supporting members 21 and 22 are electrically and mechanically fixed to the split electrodes 4L and 4R and the common electrode 6 on the first and second main surfaces, respectively, of the vibrator 2 in the vicinity of the node axis n1. Supporting members 23 and 24 are electrically and mechanically fixed to the split electrodes 4L and 4R and the common electrode 6 on the first and second main surfaces, respectively, of the vibrator 2 in the vicinity of the node axis n2. More specifically, the supporting member 21 is fixed to the approximate central portion of the supporting area 4Lb of the split electrode 4L and in the vicinity of the edge of the main area 4Ra of the split electrode 4R, and the supporting member 23 is fixed in the vicinity of the edge of the main area 4La of the split electrode 4L and to the approximate central portion of the supporting area 4Rb of the split electrode 4R. As a result, the supporting members 21 and 23 are electrically insulated from each other, and are further define lead wires for the main areas 4Ra and 4La, respectively. The supporting members 22 and 24 are connected to the common electrode 6 and further define lead wires for the common electrode 6.

The supporting member 21 extends from the portions fixed to the split electrodes 4L and 4R in the widthwise direction of the vibrator 2, and further includes bending portions 25 which bend substantially perpendicularly to the node axis n1. The supporting member 22 extends from the portions fixed to the common electrode 6 in the widthwise direction of the vibrator 2, and further includes bending portions 26 which bend substantially perpendicularly to the node axis n1. The supporting members 21 and 22 are located in close proximity with each other in the vicinity of the node axis n1, and further include proximity portions 27 extending substantially parallel to the width of the vibrator 2 and along the node axis n1. The minimum gap of each of the proximity portions 27 between the supporting members 21 and 22 is about one half or less than the thickness of the vibrator 2. In the proximity portion 27, the gap between the supporting member 21 and the node axis n1 is approximately equal to that between the supporting member 22 and the node axis n1. As a result, the minimum gap between each of the supporting members 21 and 22 and the node axis n1 is about one fourth or less than the thickness of the vibrator 2. The supporting member 21 also includes an extending portion 28 extending from the proximity portion 27 in the longitudinal direction of the vibrator 2, and a portion extending from the extending portion 28 in the widthwise direction of the vibrator 2. The supporting member 22 further includes an extending portion 29 extending from the proximity portion 27 in the longitudinal direction of the vibrator 2, and a portion extending from the extending portion 29 in the widthwise direction of the vibrator 2. The extending portions 28 and 29 extend in opposite directions.

The same applies to the supporting members 23 and 24. That is, the supporting members 23 and 24 include bending portions, proximity portions, and extending portions, as in the supporting members 21 and 22.

In the above-described vibrating gyroscope 20, the supporting members 21 and 22 are located in close proximity with the node axis n1 at the position of the proximity portions 27. The supporting members 23 and 24 are located in close proximity with the node axis n2 at the position of the proximity portions 27. Accordingly, the supporting members 21 through 24 are configured such that they support the vibrator 2 in close proximity to the node axes n1 and n2. Thus, leakage of the vibration of the vibrator 2 to the exterior is greatly decreased, and the vibration is stable, thereby greatly improving the detection precision of the angular velocity.

In the vibrating gyroscope 20, the extending portions are provided for each of the supporting members 21 through 24, and the lengths of the supporting members 21 through 24 are thus increased by an amount equal to the extending portions. Accordingly, the elasticity of the supporting members 21 through 24 is greatly increased, and leakage of the vibration of the vibrator 2 is less than that of the vibrator 2 of the vibrating gyroscope 1. As a result, the vibration of the vibrator 2 is even more stable.

The lengths of the supporting members at the proximity portion are preferably shorter. Accordingly, the possibility of the two supporting members contacting each other at the proximity portion due to impact is even less, and also, the stray capacitance generated between the supporting members is further decreased, and leakage of the signal is also further decreased.

In the vibrating gyroscope 20, the extending portions 28 and 29 extend in the longitudinal direction of the vibrator 2. However, they may be extended at a desired angle with respect to the longitudinal direction of the vibrator 12. In this case, advantages similar to those obtained by this preferred embodiment are achieved.

Figure 3:
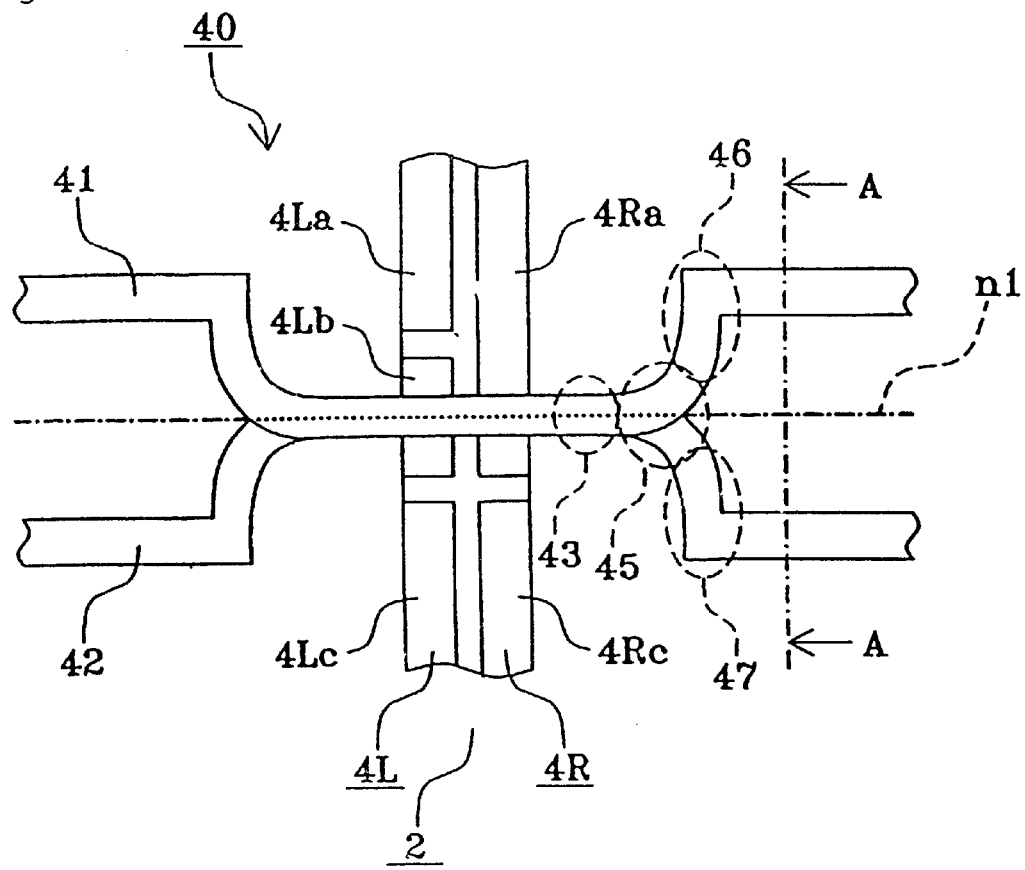
FIG. 3 is a plan view illustrating a vibrating gyroscope according to still another preferred embodiment of the present invention.
Figure 4:
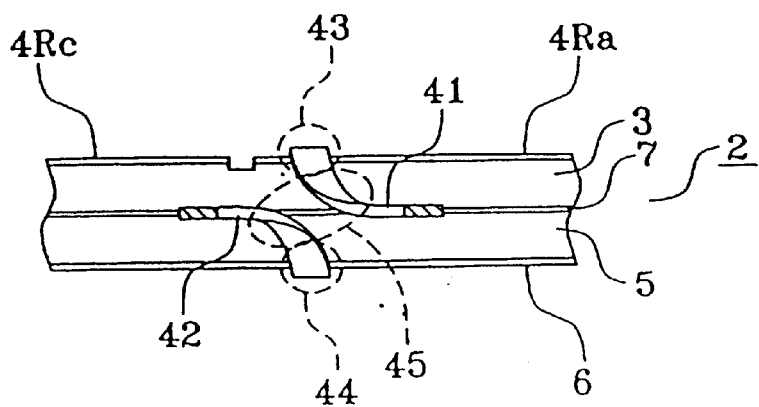
FIG. 4 is a sectional view taken along line A—A of FIG. 3.

FIG. 3 is a plan view illustrating a vibrating gyroscope according to still another preferred embodiment of the present invention. In FIG. 4, only a portion of the vibrator 2 near the node axis n1 is shown. FIG. 4 is a sectional view taken along line A—A of FIG. 3. In FIGS. 3 and 4, similar components to those shown in FIG. 2 are indicated by like reference numerals, and an explanation thereof is thus omitted.

In a vibrating gyroscope 40 shown in FIGS. 3 and 4, supporting members 41 and 42 are electrically and mechanically fixed to the split electrodes 4L and 4R and the common electrode 6 on the first and second main surfaces, respectively, of the vibrator 2 in the vicinity of the node axis n1. More specifically, the supporting member 41 is fixed to the approximate central portion of the supporting area 4Lb of the split electrode 4L and in the vicinity of the edge of the main area 4Ra of the split electrode 4R. As a result, the supporting member 41 also defines a lead wire for the main area 4Ra. The supporting member 42 is connected to the common electrode 6 and also defines a lead wire for the common electrode 6.

The supporting member 41 extends from the portions fixed to the split electrodes 4L and 4R in the widthwise direction of the vibrator 2 and further includes bending portions 43 which gently curve toward the node axis n1. The supporting member 42 extends from the portions fixed to the common electrode 6 in the widthwise direction of the vibrator 2 and further includes bending portions 44 which gently curve toward the node axis n1. The supporting members 41 and 42 are in close proximity with each other in the vicinity of the node axis n1 and then extend away from each other in the opposite directions in the longitudinal direction of the vibrator 2. In this case, the portion of the supporting members 41 and 42 which are located in the closest proximity with each other is referred to as a proximity portion 45, and the portions extending from the proximity portion 45 in the longitudinal direction of the vibrator 2 are referred to as extending portions 46 and 47. In the proximity portion 45, the minimum gap between the supporting members 41 and 42 is about one half or less than the thickness of the vibrator 2. In the proximity portion 45, the gap between the supporting member 41 and the node axis n1 is approximately equal to that between the supporting member 42 and the node axis n1. As a result, the gap between each of the supporting members 41 and 42 and the node axis n1 is about one fourth or less than the thickness of the vibrator 2. In the proximity portion 45, the supporting members 41 and 42 are not parallel with each other, but intersect with each other with a gap therebetween.

With respect to the node axis n2, supporting members are fixed to the vibrator 2 in a manner similar to the supporting members 41 and 42 with respect to the node axis n1, though they are not shown.

In the above-configured vibrating gyroscope 40, the supporting members 41 and 42 are located in close proximity with the node axis n1 at the proximity portion 45. Accordingly, they are configured such that they support the vibrator 2 in close proximity to the node axis n1. The same applies to the configuration of the supporting members at the node axis n2. Thus, leakage of the vibration of the vibrator 2 to the exterior is greatly decreased, and the vibration is stable, thereby greatly increasing the detection precision of the angular velocity.

In the vibrating gyroscope 40, the extending portions are provided for each of the supporting members, and the lengths of the supporting members are thus increased by an amount that is substantially equal to the extending portions. Accordingly, the elasticity of the supporting members is greatly increased, and leakage of the vibration of the vibrator 2 is less than that of the vibrator 2 of the vibrating gyroscope 1. As a result, the vibration of the vibrator 2 is even more stable.

The supporting members are not parallel to each other, but intersect with each other with a gap therebetween at the proximity portion. Accordingly, the possibility of the two supporting members contacting each other at the proximity portion due to impact is even less, and also, the stray capacitance generated between the supporting members is further decreased, and leakage of the signal is further reduced.

In the vibrating gyroscope 40, the extending portions 46 and 47 extend in the longitudinal direction of the vibrator 2. However, they may extend at a desired angle with respect to the longitudinal direction of the vibrator 2. In this case, advantages similar to those obtained by this preferred embodiment are achieved.

In the foregoing preferred embodiments, the central portions of the supporting members are preferably fixed to the vibrator 2, and extend in the opposite directions along the width of the vibrator 2. That is, the supporting member located on one side of the width of the vibrator 2 is integrally provided with the supporting member located on the other side of the width of the vibrator 2. However, the supporting members may be separately provided, and one end of each supporting member on either side may be fixed to the vibrator 2. In this case, advantages similar to those obtained by the vibrator 2 having the supporting members integrated to each other are achieved.

In the aforementioned preferred embodiments, the vibrator 2 includes the first and second main surfaces in the thickness direction. However, the vibrator 2 is not restricted to the configuration disclosed in the foregoing preferred embodiments, such as a vibrator having first and second main surfaces, and may be a prismatic or cylindrical vibrator.

Figure 5:
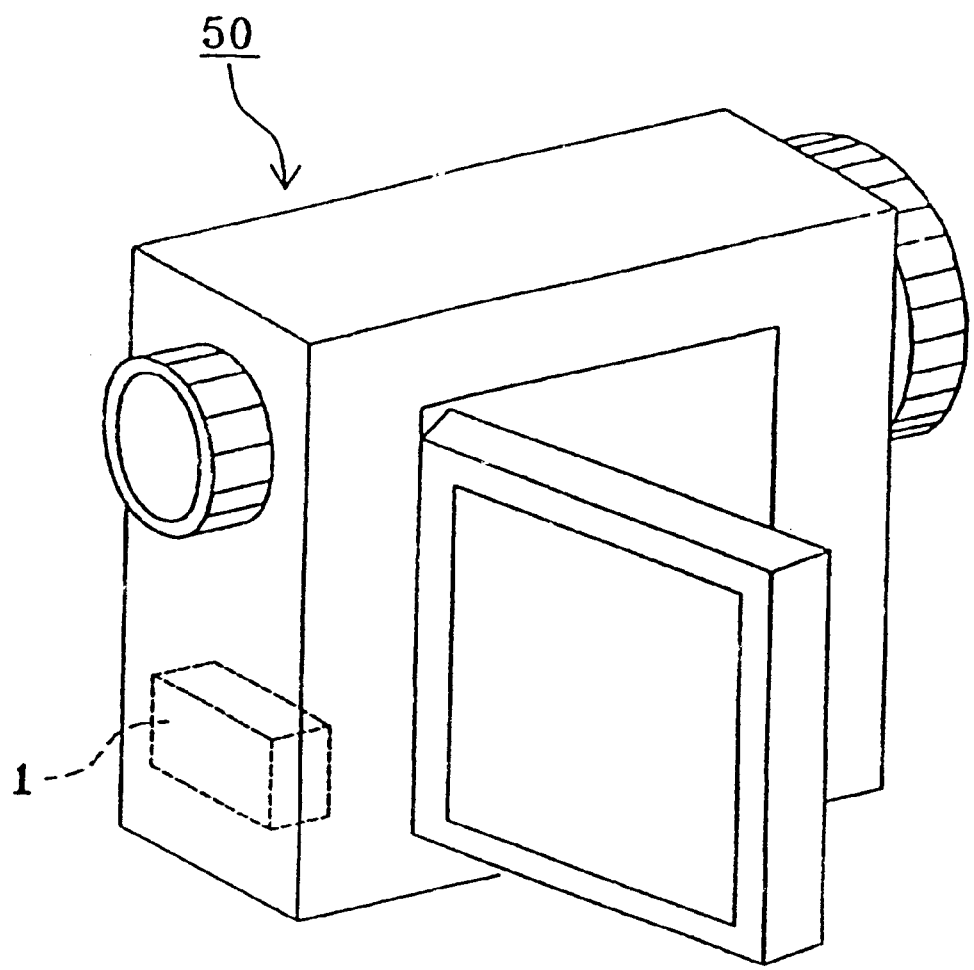
FIG. 5 is a perspective view illustrating an electronic unit according to a further preferred embodiment of the present invention.

FIG. 5 is a perspective view illustrating a video camera, as an example of an electronic unit according to a further preferred embodiment of the present invention. In FIG. 5, a video camera 50 includes the vibrating gyroscope 1 of the present invention as a hand-shaking correction device.

In this video camera 50, high-precision angular velocity information is obtained, and the performance of the video camera 50 is greatly improved.

The electronic unit of the present invention includes not only a video camera, but also all types of electronic units using a vibrating gyroscope, such as a digital camera using a vibrating gyroscope as a hand-shaking correction device, a navigation system using a vibrating gyroscope as a position detecting device, and a system for detecting that an automobile has turned over onto its side.

While the present invention has been described with reference to what are at present considered to be preferred embodiments, it is to be understood that various changes and modifications may be made thereto without departing from the invention in its broader aspects and therefore, it is intended that the appended claims cover all such changes and modifications that fall within the true spirit and scope of the invention.

What is claimed is:

1. A vibrating gyroscope comprising:
   a bar-shaped vibrator for performing double-end-free bending vibration in a thickness direction thereof in response to receipt of a drive signal; and
   a pair of supporting members arranged to sandwich said vibrator in the vicinity of two node axes of said vibrator from both sides of said vibrator in the thickness direction thereof, said pair of supporting members being fixed to said vibrator;
   wherein said pair of supporting members extend from locations at which said supporting members are fixed to said vibrator in the widthwise direction of said vibrator, and include bending portions which bend toward each of the node axes, and a proximity portion at which said pair of supporting members are in close proximity with each other with a gap therebetween in the vicinity of the corresponding node axis.

2. A vibrating gyroscope according to claim 1, wherein said pair of supporting members extend substantially parallel to the widthwise direction of said vibrator with the gap at the proximity portion.

3. A vibrating gyroscope according to claim 1, wherein said pair of supporting members intersect with each other with the gap at the proximity portion.

4. A vibrating gyroscope according to claim 1, wherein said pair of supporting members include extending portions extending in the longitudinal direction of said vibrator via the bending portions and the proximity portion from the positions at which said pair of supporting members are fixed to said vibrator.

5. A vibrating gyroscope according to claim 1, wherein a minimum gap between said pair of supporting members at the proximity portion is about one half or less than the thickness of said vibrator.

6. A vibrating gyroscope according to claim 1, wherein, at the proximity portion, a gap between one of said pair of supporting members and the node axis is substantially equal to a gap between the other supporting member and the node axis.

7. A vibrating gyroscope according to claim 1, wherein said vibrator includes a first main surface and a second main surface extending in the thickness direction, electrodes are provided on the first main surface and the second main surface, and said pair of supporting members are fixed to the electrodes.

8. A vibrating gyroscope according to claim 1, wherein the bending portions bend substantially perpendicularly to the corresponding node axis.

9. An electronic unit comprising the vibrating gyroscope set forth in claim 1.

10. A vibrating gyroscope comprising:

a vibrator; and a pair of supporting members arranged to sandwich said vibrator in the vicinity of two node axes of said vibrator from both sides of said vibrator in the thickness direction thereof, said pair of supporting members being fixed to said vibrator;

wherein said pair of supporting members extend from locations at which said supporting members are fixed to said vibrator in the widthwise direction of said vibrator, and include bending portions which bend toward each of the node axes, and a proximity portion at which said pair of supporting members are in close proximity with each other with a gap therebetween in the vicinity of the corresponding node axis.

11. A vibrating gyroscope according to claim 10, wherein said vibrator is bar-shaped.

12. A vibrating gyroscope according to claims 11, wherein said bar-shaped vibrator performs double-end-free bending vibration in the thickness direction thereof in response to receipt of a drive signal.

13. A vibrating gyroscope according to claim 10, wherein said pair of supporting members extend substantially parallel to the widthwise direction of said vibrator with the gap at the proximity portion.

14. A vibrating gyroscope according to claim 10, wherein said pair of supporting members intersect with each other with the gap at the proximity portion.

15. A vibrating gyroscope according to claim 10, wherein said pair of supporting members include extending portions extending in the longitudinal direction of said vibrator via the bending portions and the proximity portion from the positions at which said pair of supporting members are fixed to said vibrator.

16. A vibrating gyroscope according to claim 10, wherein a minimum gap between said pair of supporting members at the proximity portion is about one half or less than the thickness of said vibrator.

17. A vibrating gyroscope according to claim 10, wherein, at the proximity portion, a gap between one of said pair of supporting members and the node axis is substantially equal to a gap between the other supporting member and the node axis.

18. A vibrating gyroscope according to claim 10, wherein said vibrator includes a first main surface and a second main surface in the thickness direction, electrodes are provided on the first main surface and the second main surface, and said pair of supporting members are fixed to the electrodes.

19. A vibrating gyroscope according to claim 10, wherein the bending portions bend substantially perpendicularly to the corresponding node axis.

20. An electronic unit comprising the vibrating gyroscope set forth in claim 10.

* * * * *